US011483692B2

(12) United States Patent
Yuan

(10) Patent No.: US 11,483,692 B2
(45) Date of Patent: Oct. 25, 2022

(54) SYSTEM, METHOD AND COMPUTER-READABLE STORAGE MEDIUM REALIZING INTERNET OF THINGS FOR SMART CITY BASED ON STREET LAMPS AND LAMP POSTS

(71) Applicant: SHENZHEN SHINYO ENERGY TECHNOLOGY PLC., Shenzhen (CN)

(72) Inventor: Xiuting Yuan, Shenzhen (CN)

(73) Assignee: SHENZHEN SHINYO ENERGY TECHNOLOGY PLC., Shenzhen (CN)

( * ) Notice: Subject to any disclaimer, the term of this patent is extended or adjusted under 35 U.S.C. 154(b) by 186 days.

(21) Appl. No.: 16/917,822

(22) Filed: Jun. 30, 2020

(65) Prior Publication Data

US 2020/0335228 A1 Oct. 22, 2020

Related U.S. Application Data

(63) Continuation of application No. PCT/CN2018/083272, filed on Apr. 17, 2018.

(30) Foreign Application Priority Data

Mar. 12, 2018 (CN) .......................... 201810201975.9

(51) Int. Cl.
*H04W 4/80* (2018.01)
*G16Y 20/10* (2020.01)
(Continued)

(52) U.S. Cl.
CPC ............... *H04W 4/80* (2018.02); *G16Y 20/10* (2020.01); *G16Y 30/00* (2020.01); *G16Y 40/10* (2020.01); *G16Y 40/35* (2020.01); *H04W 84/18* (2013.01)

(58) Field of Classification Search
CPC ........ G16Y 20/10; G16Y 30/00; G16Y 40/10; G16Y 40/35; H04L 67/12; H04L 67/18;
(Continued)

(56) References Cited

U.S. PATENT DOCUMENTS

2009/0073694 A1* 3/2009 Scannell, Jr. ........... F21S 6/002
362/253

FOREIGN PATENT DOCUMENTS

CA 2701974 A1 10/2010
CN 204557806 U 8/2015
(Continued)

OTHER PUBLICATIONS

International Search Report for PCT/CN2018/083272.

*Primary Examiner* — Zhensheng Zhang

(57) ABSTRACT

The present disclosure provides a system, a method and a computer-readable storage medium for realizing Internet of Things for smart city based on street lamps and lamp posts. The system includes: a plurality of data collection components, a plurality of detachable street lamps, a repeater, a hub, a cloud server, a terminal device; where the one or more data collection components are communicatively connected with the one or more detachable street lamps, the one or more detachable street lamp are communicatively connected with the repeater, the repeater is communicatively connected with the hub, the hub is communicatively connected with the cloud server, and the cloud server is communicatively connected with the terminal device. The present disclosure can not only improve the efficiency of city monitoring, but also save a lot of costs.

14 Claims, 4 Drawing Sheets

(51) Int. Cl.
  *G16Y 40/10* (2020.01)
  *G16Y 30/00* (2020.01)
  *G16Y 40/35* (2020.01)
  *H04W 84/18* (2009.01)

(58) Field of Classification Search
  CPC ........... H04L 67/2823; H04L 67/2842; H04W 24/10; H04W 4/38; H04W 4/80; H04W 84/18
  See application file for complete search history.

(56) References Cited

FOREIGN PATENT DOCUMENTS

| | | | |
|---|---|---|---|
| CN | 206194062 U | | 5/2017 |
| CN | 206361617 U | * | 7/2017 |
| CN | 107578617 A | | 1/2018 |
| CN | 207065367 U | | 3/2018 |

* cited by examiner

SYSTEM, METHOD AND COMPUTER-READABLE STORAGE MEDIUM REALIZING INTERNET OF THINGS FOR SMART CITY BASED ON STREET LAMPS AND LAMP POSTS

CROSS REFERENCE TO RELATED APPLICATION

The present application is a continuation-application of International Application PCT/CN2018/083272, with an international filing date of Apr. 17, 2018, which claims foreign priority of Chinese Patent Application No. 201810201975.9, filed on Mar. 12, 2018 in the State Intellectual Property Office of China, the contents of all of which are hereby incorporated by reference.

BACKGROUND

1. Technical Field

The present disclosure relates to communication technology, and particularly to a system, a method and a computer-readable storage medium for realizing Internet of Things for smart city based on street lamps and lamp posts.

2. Description of Related Art

With the rapid development of the Internet of Things technology, the monitoring of cities based on the Internet of Things which realize smart city has attracted more and more attentions. In which, smart city refers to using information and communication technologies to detect, analyze and integrate various essential information for the core system of city operation, so as to respond intelligently to various needs including livelihood, environmental protection, public safety, urban service, industrial and commercial activities.

In the prior art, when a city is to be monitored, it usually needs to excavate roads to set poles and wires, so as to build a monitoring network system. However, this method needs to set a large number of poles, which is not only inefficient but also extremely costly.

SUMMARY

To resolve the above-mentioned technical problem in the prior art, it is necessary to provide system, a method and a computer-readable storage medium for realizing Internet of Things for smart city based on street lamps and lamp posts that can improve efficiency while saving costs in view of the above-mentioned technical problem.

A system for realizing Internet of Things for smart city based on street lamps and lamp posts is provided. The system includes one or more data collection components, one or more detachable street lamps, a repeater, a hub, a cloud server, a terminal device; where the one or more data collection components are communicatively connected with the one or more detachable street lamps, the one or more detachable street lamp are communicatively connected with the repeater, the repeater is communicatively connected with the hub, the hub is communicatively connected with the cloud server, and the cloud server is communicatively connected with the terminal device, where:

the one or more data collection components are configured to collect data and send the collected data to the one or more detachable street lamps;

the one or more detachable street lamps are configured to receive the data sent by the one or more data collection components and send the received data to the repeater via a built-in gateway;

the repeater is configured to receive the data sent by the one or more detachable street lamps and send the received data to the hub;

the hub is configured to receive the data sent by the repeater and send the received data to the cloud server;

the cloud server is configured to receive the data sent by the hub, process the received data, and send the processed data to the terminal device; and the terminal device is configured to receive the processed data and display the received data through a display screen.

In one embodiment, the data collection component includes at least one of a security data collection module, a traffic navigation data collection module, and a radio frequency identification module.

In one embodiment, the data collected by the security data collection module includes at least one of smoke monitoring data, gas monitoring data, dust monitoring data, mountain monitoring data, water level monitoring data, construction site monitoring data.

In one embodiment, the data collected by the traffic navigation data collection module includes parking space data and traffic live data In one embodiment, the system further includes:

a lamp pole matched with each of the one or more detachable street lamps, where the lamp pole is disposed with at least one of a charging pile and an electronic advertising screen.

A method for realizing Internet of Things for smart city based on street lamps and lamp posts is provided. The method includes executing on a processor steps of:

collecting data and sending the collected data to one or more detachable street lamps through one or more data collection components;

receiving the data sent by the one or more data collection components and sending the received data to a repeater via a built-in gateway through the one or more detachable street lamps;

receiving the data sent by the one or more detachable street lamps and sending the received data to a hub through the repeater;

receiving the data sent by the repeater and sending the received data to a cloud server through the hub;

receiving the data sent by the hub, processing the received data, and sending the processed data to a terminal device through the cloud server; and receiving the processed data and displaying the received data using a display screen through the terminal device.

In one embodiment, the data collection component includes at least one of a security data collection module, a traffic navigation data collection module, and a radio frequency identification module.

In one embodiment, the step of collecting the data and sending the collected data to the one or more detachable street lamps through the one or more data collection components includes:

obtaining a current tag information set corresponding to a target monitoring object set using the radio frequency identification module and sending the current tag information set to the one or more detachable street lamps through the data collection component;

the step of receiving the data sent by the hub, processing the received data, and sending the processed data to the terminal device through the cloud server includes:

receiving the current tag information set and comparing the current tag information set with a pre-stored tag information set through the cloud server; and obtaining geographic location information and category information corresponding to a reduced tag information to send to the terminal device through the cloud server, in response to a tag information amount corresponding to the current tag information set being reduced with respect to a tag information amount corresponding to the pre-stored tag information set In one embodiment, the step of collecting the data and sending the collected data to the one or more detachable street lamps through the one or more data collection components includes:

collecting the data using an infrared sensor disposed at each parking space and sending the collected data to the one or more detachable street lamps through the data collection component;

the step of receiving the data sent by the hub, processing the received data, and sending the processed data to the terminal device through the cloud server includes:

determining whether each parking space is occupied or not based on the received data through the cloud server; and obtaining the geographic location information corresponding to the unoccupied parking space and sending the geographic location information to the terminal device through the cloud server.

A computer-readable storage medium is provided. The medium stores a computer program, where the following steps are implemented when the computer program is executed by a processor:

collecting data and sending the collected data to one or more detachable street lamps through one or more data collection components;

receiving the data sent by the one or more data collection components and sending the received data to a repeater via a built-in gateway through the one or more detachable street lamps;

receiving the data sent by the one or more detachable street lamps and sending the received data to a hub through the repeater;

receiving the data sent by the repeater and sending the received data to a cloud server through the hub;

receiving the data sent by the hub, processing the received data, and sending the processed data to a terminal device through the cloud server; and receiving the processed data and displaying the received data using a display screen through the terminal device.

In the above-mentioned system, method and storage medium for realizing Internet of Things for smart city based on street lamps and lamp posts, the existing street lamps are used as one of the carriers for data transmission. Since the street lamps which ordinarily exist in the city and have existing power supply lines are used as one of the carriers for data transmission, it only needs simple modifications on the original street lamps without excavating roads to set poles and wires, and not only improves efficiency but also greatly saves costs.

DETAILED DESCRIPTION

In order to make the purpose, technical solutions and advantages of the present disclosure more clear, the technical solutions in the present disclosure will be described below in further detail with reference to the drawings and the and embodiments. It should be understood that, the specific embodiments described herein are only used to explain the present disclosure, and are not used to limit the present disclosure.

Figure 1:
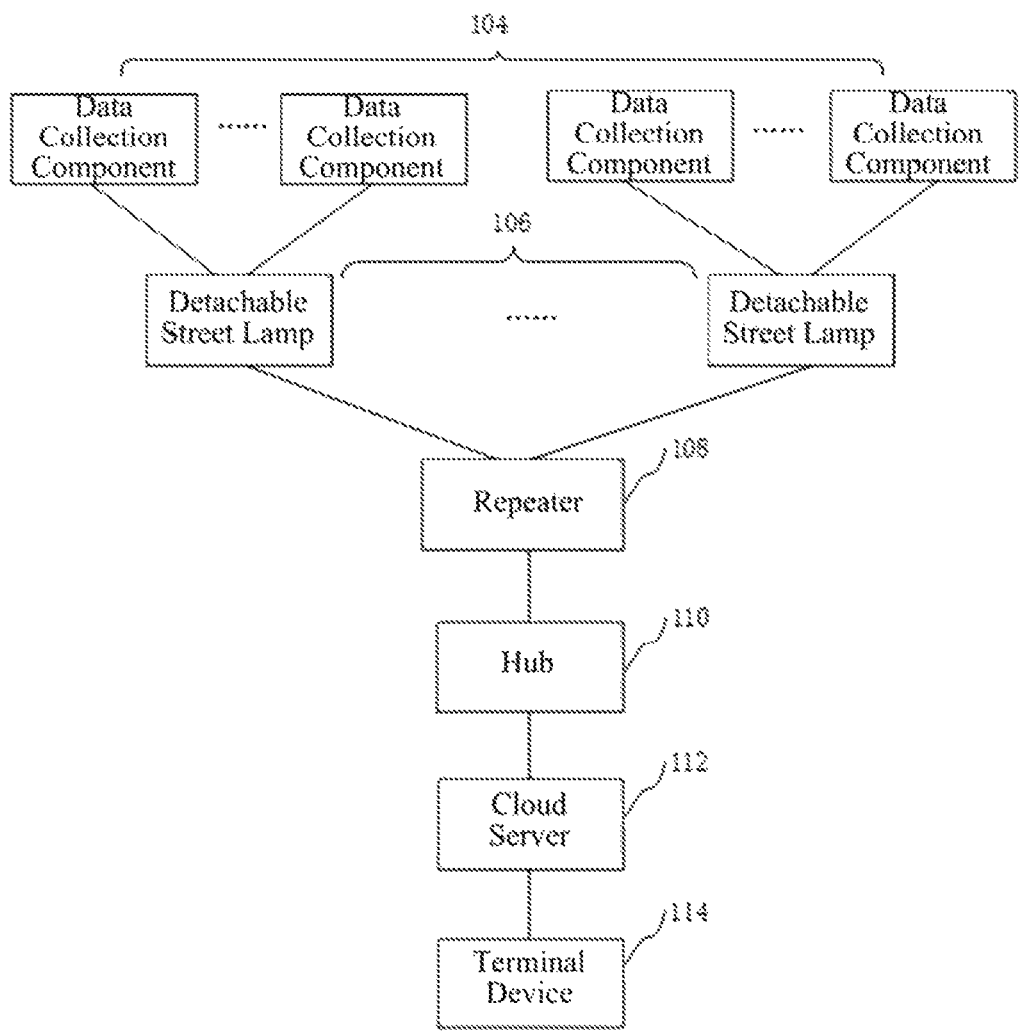
FIG. 1 is a schematic block diagram of an embodiment of a system for realizing Internet of Things for smart city based on street lamps and lamp posts according to the present disclosure.

FIG. 1 is a schematic block diagram of an embodiment of a system for realizing Internet of Things for smart city based on street lamps and lamp posts according to the present disclosure. In this embodiment, as shown in FIG. 1, a system for realizing Internet of Things for smart city based on street lamps and lamp posts is provided. The system includes a plurality of data collection components 104, a plurality of detachable street lamps 106, a repeater 108, a hub 110, a cloud server 112, and a terminal device 114.

In which, the data collection component 104 can include various sensors such as a temperature sensor, a displacement sensor, a humidity sensor, a smoke sensor, and an infrared sensor. One or more corresponding kinds of sensors can be provided at positions around the street lamp which are to be monitored as required. The data collection component 104 can also include one or more cameras which can be integrated on the street lamp or be installed at positions other than the street lamp that need to be monitored.

In one embodiment, the data collection component 104 further includes a wireless communication module such as a Wi-Fi (Wireless Fidelity) module, a Bluetooth module, a ZigBee module, an NB-IoT (narrow band Internet of Things), and Lora communication module. After the data collection module 104 collects data through sensors, cameras, and the like, it can send the collected data to the detachable street lamp 106 through the wireless communication module.

The detachable street lamp 106 and its corresponding lamp pole are detachably connected, and can be disposed at any place where there are lamp poles along the traffic routes of a city. A plurality of data collection components can be disposed near each detachable street lamp 106. The detachable street lamp is provided with a main controller and a wireless communication module electrically coupled to the main controller. The data sent by the data collection component can be received through the wireless communication module. The detachable street lamp 106 further includes a built-in gateway, and the detachable street lamp 106 sends the received data to the repeater 108 through the gateway. In one embodiment, the repeater 108 and the detachable street lamp 106 are connected through a wired network.

In one embodiment, the detachable street lamp 106 is further provided with an intelligent dimming module electrically coupled to the main controller. The intelligent dimming module is used to adjust the brightness of the street lamp. Specifically, the intelligent dimming module senses the brightness of the external environment through the light intensity sensor. In the case that the brightness of the external environment is greater than a preset threshold, the detachable street lamp 106 is controlled to lower the brightness; otherwise, in the case that the brightness of the external environment is less than the preset threshold, the detachable street lamp 106 is controlled to higher the brightness, thereby saving energy.

In one embodiment, the detachable street lamp 106 is further provided with a fault detection module electrically coupled to the main controller. The fault detection module automatically detects the fault of the detachable street lamp 106. In the case that fault data is detected, the fault data is sent to the repeater through the gateway. Specifically, the fault detection module can collect current data of the street lamp through a current sensor, and transmit the collected current data to the main control. The main controller determines whether the street lamp is faulty according to the current data. In the case that the street lamp fails, the main controller generates an alarm signal to send through the gateway, and finally sends the alarm signal to the terminal device.

The repeater 108 is used to receive the data sent by the detachable street lamp 106 and send the received data to the hub 110, and the repeater 108 is communicatively connected with the hub 110 through a wired network. In this embodiment, by disposing the repeater 108 and the hub 110 to forward data, the distance of network transmission can be expanded.

The hub 110 is communicatively connected with the repeater 108 through the wired network and further connected with the cloud server 112 through a wireless network. In this embodiment, the hub 110 receives the data sent by the repeater 108 and sends the received data to the cloud server 112.

Furthermore, the cloud server 112 is used to receive the data of the hub 110 and process the received data by performing at least one of counting, analyzing, screening, comparison, determination, encryption, storage, and the like on the received data. Furthermore, the cloud server 112 sends the processed data to the terminal device 114.

The terminal device 114 communicates with the cloud server 112 through a wireless network, receives the data sent by the cloud server 112, and displays the received data through a display screen.

In one embodiment, the terminal device 114 includes a background management terminal and an ordinary user terminal, where the user corresponding to the background management terminal and the user corresponding to the ordinary user terminal have different rights. The user corresponding to the background management terminal can receive all the data, and can store, modify and dynamically analyze the data. For example, the background management terminal can be a terminal set up by a government related unit for overall monitoring of the city, and the ordinary user terminal can receive the data corresponding to the right of its user by logging into the cloud server 112 so as to display. As an example, in the case that the data collection module 104 collects traffic live data through a camera, the ordinary user terminal can receive the traffic live data sent by the cloud server 112 and present the traffic live data with videos.

In the above-mentioned system for realizing Internet of Things for smart city based on street lamps and lamp posts, the street lamps are used as one of the carriers for data transmission, and the street lamps, the data collection components, the repeater, the hub, the cloud server, the terminal device and the like are built as a smart city monitoring system communicating through networks, thereby monitoring a city. Since the street lamps are ordinarily existing in the city and have existing power supply lines, it only needs simple modifications on the original street lamps without excavating roads to set poles and wires, and not only improves efficiency but also greatly saves costs.

In one embodiment, the data collection component includes at least one of a security data collection module, a traffic navigation data collection module, and a radio frequency identification module. In which, the security data collection module is used to collect data related to the safety of life and property; the traffic navigation data collection module is used to collect road traffic-related data including vehicle flow data, pedestrian flow data, and the like; and the radio frequency identification module is used to send radio frequency signals to a target monitoring object, at the same time receive the radio frequency signals returned by the target monitoring object. The target monitoring object refers to an object to be monitored such as a well cover, a cable, and a trash can. The target monitoring object is disposed with an RFID (radio frequency identification) electronic tag which can be read by a radio frequency identification module.

In one embodiment, the data collected by the security data collection module includes at least one of smoke monitoring data, gas monitoring data, dust monitoring data, mountain monitoring data, water level monitoring data, construction site monitoring data. In which, the smoke monitoring data can be smoke image information data collected by the camera; the gas monitoring data can be the concentration data of gases such as toxic, flammable, and explosive gas; the dust monitoring data can be concentration data of dust; the mountain monitoring data can be the data obtained by collecting the image of a specific position of the mountain through a camera; the water level monitoring data can be data obtained by monitoring the water level of the underground pipeline or river channel; and the construction site monitoring data can be data obtained by collecting the image of the construction site through a camera.

In one embodiment, the data collected by the traffic navigation data collection module includes parking space data and traffic live data. In which, the parking space data refers to data used to represent whether a parking space is occupied, and the traffic live data refers to data obtained by collecting the road condition in real-time through a camera.

In one embodiment, the above-mentioned system further includes: a lamp pole matched with each of the one or more detachable street lamps, where the lamp pole is disposed with at least one of a charging pile and an electronic advertising screen. In which, the charging pile is electrically coupled to the street lamp and can be used to charge an electric vehicle; and the electronic advertising screen is electrically coupled to the street lamp and can receive broadcast information such as the weather, environment, emergency information and other advertising information sent by the street lamp, so as to display and play the information.

Figure 2:
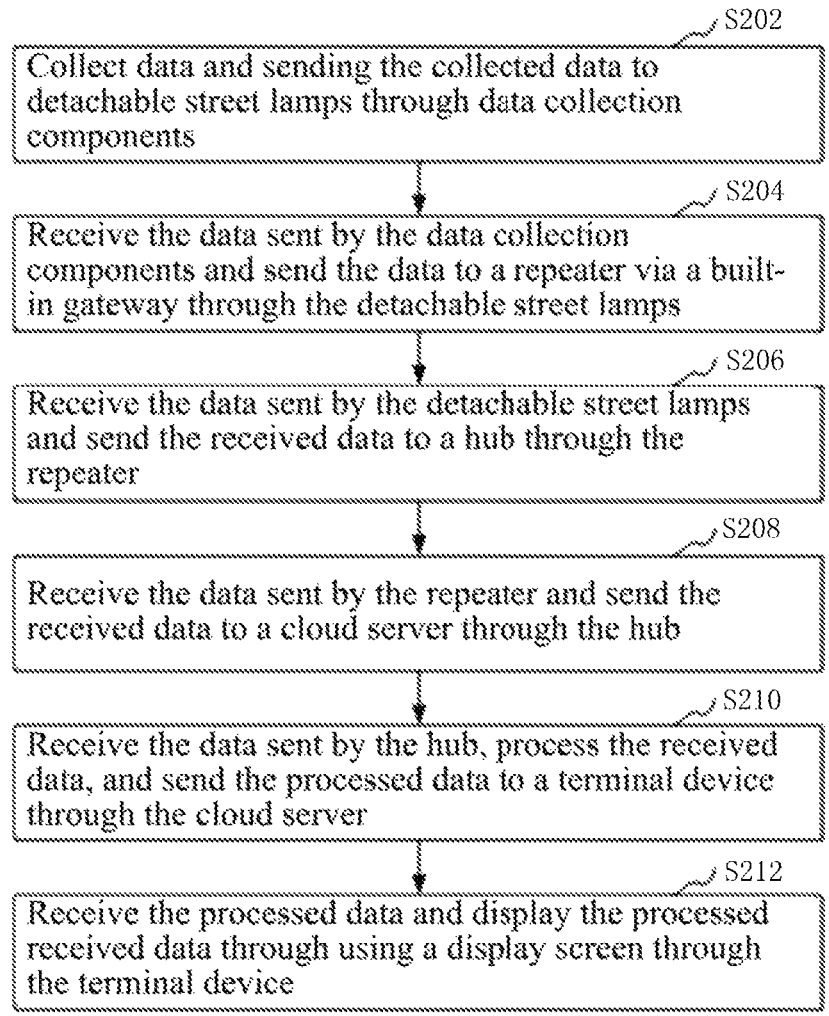
FIG. 2 is a flow chart of an embodiment of a method for realizing Internet of Things for smart city based on street lamps and lamp posts according to the present disclosure.

FIG. 2 is a flow chart of an embodiment of a method for realizing Internet of Things for smart city based on street lamps and lamp posts according to the present disclosure. In this embodiment, a method for realizing Internet of Things for smart city based on street lamps and lamp posts is provided. The method is a computer-implemented method executable for a processor. In this embodiment, as shown in FIG. 2, the method includes the following steps.

S202: collecting data and sending the collected data to detachable street lamp(s) through data collection component(s).

The data collection component can include various sensors such as a temperature sensor, a displacement sensor, a humidity sensor, a smoke sensor, and an infrared sensor. One or more corresponding kinds of sensors can be provided at positions around the street lamp which are to be monitored as required. The data collection component can also include one or more cameras which can be integrated on the street lamp or be installed at positions other than the street lamp that need to be monitored.

In one embodiment, the data collection component further includes a wireless communication module such as a Wi-Fi module, a Bluetooth module, a ZigBee module, an NB-IoT, and Lora communication module. After the data collection module collects data through sensors, cameras, and the like, it can send the collected data to the detachable street lamp through the wireless communication module.

S204: receiving the data sent by the data collection component(s) and sending the received data to a repeater via a built-in gateway through the detachable street lamp(s).

In which, the detachable street lamp and its corresponding lamp pole are detachably connected, and can be disposed at any place where there are lamp poles along the traffic routes of a city. A plurality of data collection components can be disposed near each detachable street lamp. The detachable street lamp is provided with a main controller and a wireless communication module electrically coupled to the main controller. The data sent by the data collection component can be received through the wireless communication module. The detachable street lamp further includes a built-in gateway, and the detachable street lamp sends the received data to the repeater through the gateway. In which, the repeater and the detachable street lamp are connected through a wired network.

In one embodiment, the detachable street lamp is further provided with an intelligent dimming module electrically coupled to the main controller. The intelligent dimming module senses the brightness of the external environment through the light intensity sensor. In the case that the brightness of the external environment is greater than a preset threshold, the detachable street lamp is controlled to lower the brightness; and in the case that the brightness of the external environment is less than the preset threshold, the detachable street lamp is controlled to higher the brightness, thereby saving energy.

In one embodiment, the detachable street lamp is further provided with a fault detection module electrically coupled to the main controller. The fault detection module automatically detects the fault of the detachable street lamp. In the case that fault data is detected, the fault data is sent to the repeater through the gateway.

S206: receiving the data sent by the detachable street lamp(s) and sending the received data to a hub through the repeater.

In which, the repeater is communicatively connected with the hub through a wired network.

In this embodiment, by disposing the repeater and the hub to forward data, the distance of network transmission can be expanded.

S208: receiving the data sent by the repeater and sending the received data to a cloud server through the hub.

In which, the hub is communicatively connected with the repeater through the wired network and further connected with the cloud server through a wireless network.

S210: receiving the data sent by the hub, processing the received data, and sending the processed data to a terminal device through the cloud server.

S212: receiving the processed data and displaying the received data using a display screen through the terminal device.

In which, the terminal device and the cloud server are communicatively connected through a wireless network.

In one embodiment, the terminal device includes a background management terminal and an ordinary user terminal, and the user corresponding to the background management terminal and the user corresponding to the ordinary user terminal have different rights. The user corresponding to the background management terminal can receive all the data, and can store, modify, and dynamically analyze the data. For example, the background management terminal can be a terminal set up by a government related unit for overall monitoring of the city, and the ordinary user terminal can receive the data corresponding to the right of its user by logging into the cloud server so as to display. For example, in the case that the data collection module collects traffic live data through a camera, the ordinary user terminal can receive the traffic live data sent by the cloud server and present the traffic live data with videos.

In the above-mentioned method for realizing Internet of Things for smart city based on street lamps and lamp posts, the collection components are configured to collect data and send the collected data to the detachable street lamp(s); the detachable street lamps are configured to receive the data sent by the data collection component(s) and send the received data to the repeater via a built-in gateway; the repeater is configured to receive the data sent by the detachable street lamp(s) and send the received data to the hub; the hub is configured to receive the data sent by the repeater and send the received data to the cloud server; the cloud server is configured to receive the data sent by the hub, process the received data, and send the processed data to the terminal device; and the terminal device is configured to receive the processed data and display the received data through a display screen. Since the street lamps which ordinarily exist in the city and have existing power supply lines are used as one of the carriers for data transmission, it only needs simple modifications on the original street lamps without excavating roads to set poles and wires, and not only improves efficiency but also greatly saves costs.

In one embodiment, the data collection component includes at least one of a security data collection module, a traffic navigation data collection module, and a radio frequency identification module.

Figure 3:
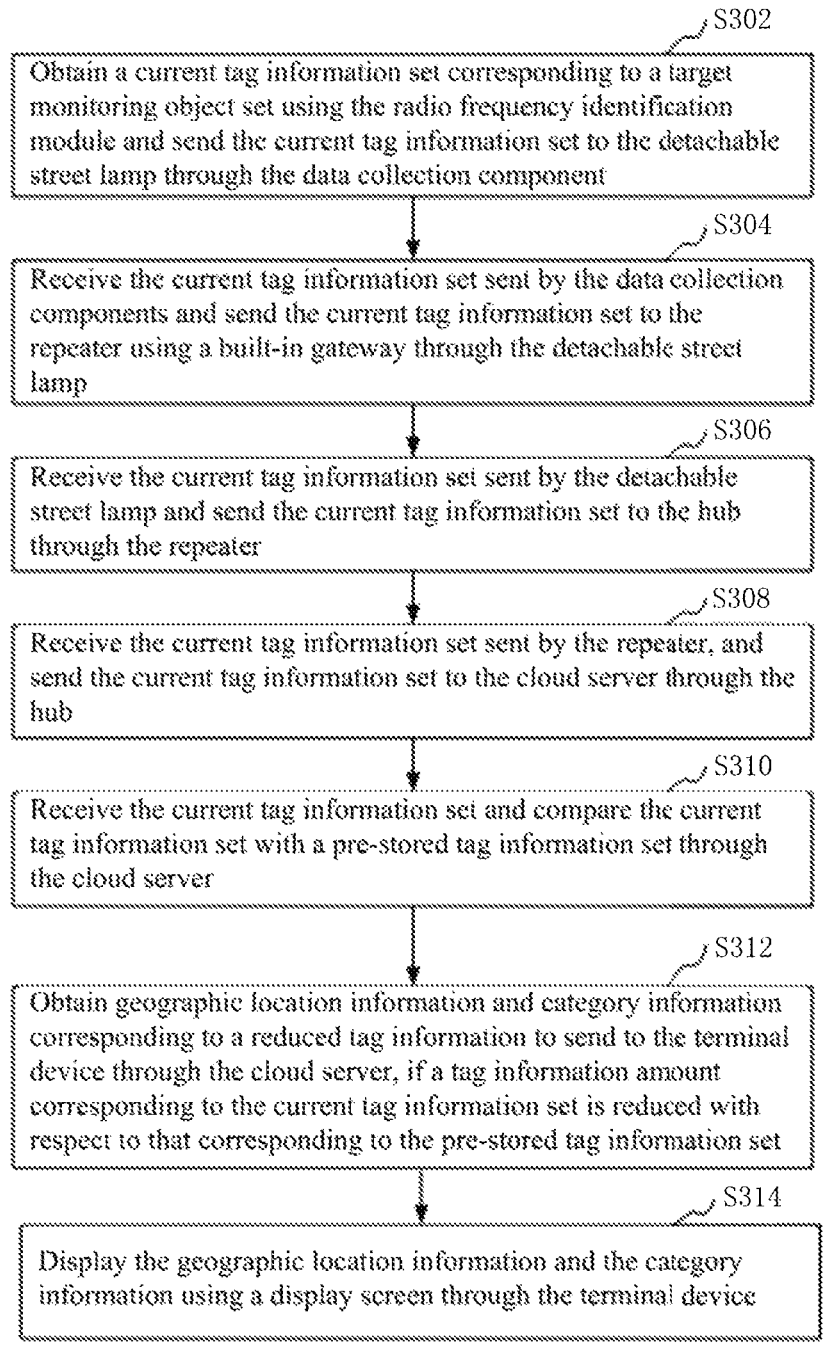
FIG. 3 is a flow chart of another embodiment of a method for realizing Internet of Things for smart city based on street lamps and lamp posts according to the present disclosure.

FIG. 3 is a flow chart of another embodiment of a method for realizing Internet of Things for smart city based on street lamps and lamp posts according to the present disclosure. In this embodiment, as shown in FIG. 3, the method includes the following steps.

S302: obtaining a current tag information set corresponding to a target monitoring object set using the radio frequency identification module and sending the current tag information set to the one or more detachable street lamps through the data collection component.

Specifically, the target monitoring object refers to an object to be monitored such as a well cover, a cable, and a trash can. The target monitoring object is disposed with an RFID electronic tag which can be read by a radio frequency identification module. The current tag information set refers to a set of tag information corresponding to the electronic tags currently capable of performing radio frequency communication with the radio frequency identification module, where the tag information can be a number corresponding to the electronic tag.

Specifically, the radio frequency identification module sends a radio frequency signal to each target monitoring object in the target monitoring object set. If the radio frequency signal returned by the target monitoring object can be received, the tag information corresponding to the target monitoring object is added to the current tag information set.

S304: receiving the current tag information set sent by the data collection components and sending the current tag information set to the repeater using a built-in gateway through the detachable street lamp.

S306: receiving the current tag information set sent by the detachable street lamp and sending the current tag information set to the hub through the repeater.

S308: receiving the current tag information set sent by the repeater and sending the current tag information set to the cloud server through the hub.

S310: receiving the current tag information set and comparing the current tag information set with a pre-stored tag information set through the cloud server.

In which, the pre-stored tag information set refers to a set of the tag information of all objects to be monitored.

In one embodiment, the tag information pre-stored in the cloud server is classified and stored according to different radio frequency identification modules. After receiving the current tag information set, the cloud server first classifies the tag information in the current tag information set according to different radio frequency identification modules, and compares the current tag information set corresponding to each radio frequency identification module with its corresponding pre-stored tag information set, thereby improving the accuracy of the comparison.

It can be understood that, the tag information set pre-stored in the cloud server can be adjusted according to the actual conditions by, for example, adding tag information, reducing tag information, changing tag information, and the like.

S312: obtaining geographic location information and category information corresponding to a reduced tag information to send to the terminal device through the cloud server, if a tag information amount corresponding to the current tag information set is reduced with respect to a tag information amount corresponding to the pre-stored tag information set.

Specifically, the geographic location information refers to geographic location information of the target monitoring object where the electronic tag is positioned. The category information is used to represent the category of the target monitoring object such as well cover, cable, and trash can. Since an association relationship between the tag information corresponding to the electronic tag and the target monitoring object has been established in advance, through the association relationship, if the reduced tag information is obtained, the corresponding target monitoring object can be searched for based on the tag information, and the geographic location information and the category information corresponding to the target object can be obtained.

S314: displaying the geographic location information and the category information using a display screen through the terminal device.

Figure 4:
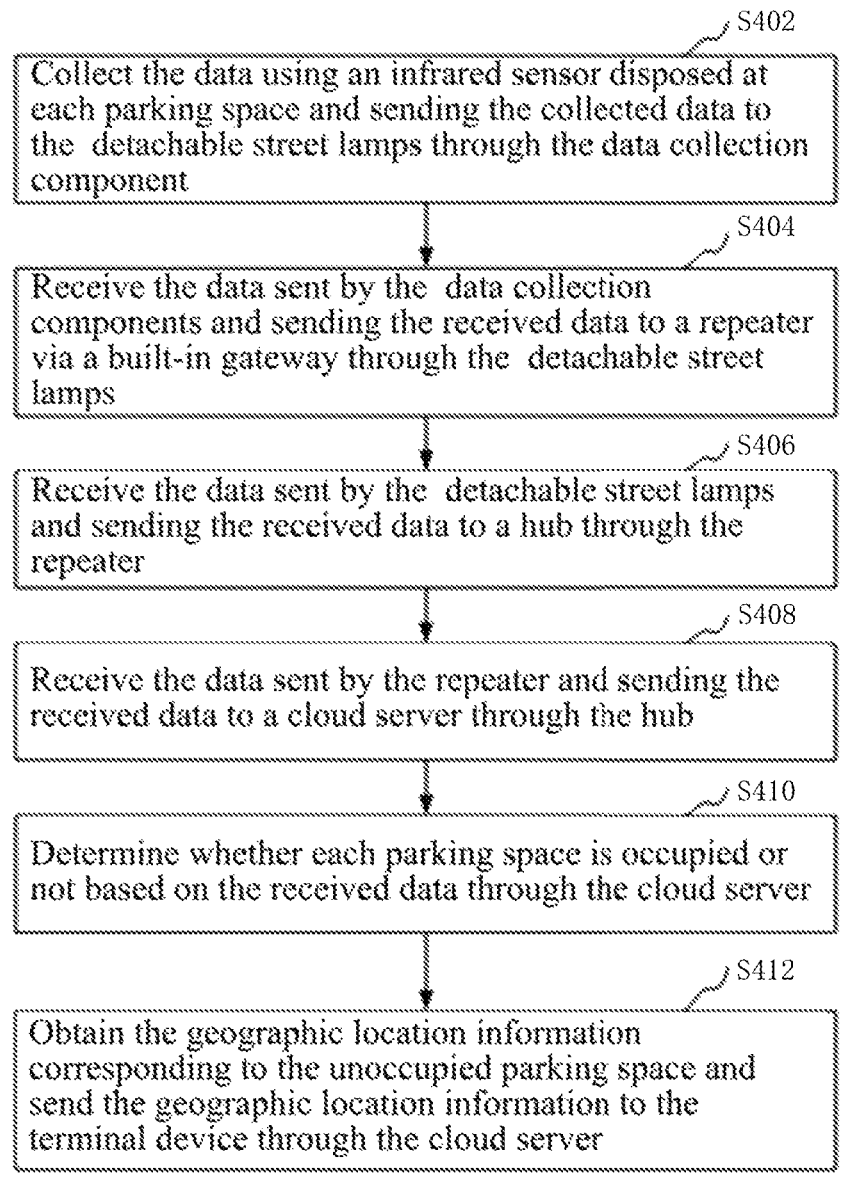
FIG. 4 is a flow chart of still another embodiment of a method for realizing Internet of Things for smart city based on street lamps and lamp posts according to the present disclosure.

FIG. 4 is a flow chart of still another embodiment of a method for realizing Internet of Things for smart city based on street lamps and lamp posts according to the present disclosure. In this embodiment, as shown in FIG. 4, the method includes the following steps.

S402: collecting the data using an infrared sensor disposed at each parking space and sending the collected data to the one or more detachable street lamps through the data collection component.

Specifically, the data collected by the infrared sensor can be used to represent whether the parking space is occupied.

S404: receiving the data sent by the one or more data collection components and sending the received data to a repeater via a built-in gateway through the one or more detachable street lamps.

S406: receiving the data sent by the one or more detachable street lamps and sending the received data to a hub through the repeater.

S408: receiving the data sent by the repeater and sending the received data to a cloud server through the hub.

S410: determining whether each parking space is occupied or not based on the received data through the cloud server.

S412: obtaining the geographic location information corresponding to the unoccupied parking space and sending the geographic location information to the terminal device through the cloud server.

Specifically, since an association relationship between the infrared sensor and the parking space have been established, after receiving the data collected by the infrared sensor, the cloud server can determine which parking spaces are occupied while which parking spaces are free based on the data, and can query the geographic location information corresponding to the free parking space from the database and send the geographic location information to the terminal device for display.

It should be understood that, although the steps in the flowcharts of FIG. 2-FIG. 4 are shown in order according to the indication of the arrows, the steps are not necessarily executed in the order indicated by the arrows. Unless clearly stated in the present disclosure, the execution of these steps is not strictly limited in the order, and these steps can be executed in other orders. Moreover, at least some of the steps in FIG. 2-FIG. 4 may include multiple sub-steps or multiple stages. These sub-steps or stages are not necessarily executed at the same time, but may be executed at different times. The execution order of these sub-steps or stages is not necessarily sequential, but may be executed in turn or alternately with at least a part of other steps or sub-steps or stages of other steps.

In one embodiment, a computer-readable storage medium is provided. The medium stores a computer program, where the following method is implemented when the computer program is executed by a processor: collecting data and sending the collected data to one or more detachable street lamps through one or more data collection components; receiving the data sent by the one or more data collection components and sending the received data to a repeater via a built-in gateway through the one or more detachable street lamps; receiving the data sent by the one or more detachable street lamps and sending the received data to a hub through the repeater; receiving the data sent by the repeater and sending the received data to a cloud server through the hub; receiving the data sent by the hub, processing the received data, and sending the processed data to a terminal device through the cloud server; and receiving the processed data and displaying the received data using a display screen through the terminal device.

In one embodiment, the data collection component includes at least one of a security data collection module, a traffic data collection module, and a radio frequency identification module.

In one embodiment, the collecting the data and sending the collected data to the one or more detachable street lamps through the one or more data collection components includes: obtaining a current tag information set corresponding to a target monitoring object set using the radio frequency identification module and sending the current tag information set to the one or more detachable street lamps through the data collection component. The receiving the data sent by the hub, processing the received data, and sending the processed data to the terminal device through the cloud server includes: receiving the current tag information set and comparing the current tag information set with a pre-stored tag information set through the cloud server; and obtaining geographic location information and category information corresponding to a reduced tag information to send to the terminal device through the cloud server, if a tag information amount corresponding to the current tag information set is reduced with respect to a tag information amount corresponding to the pre-stored tag information set.

In one embodiment, the collecting the data and sending the collected data to the one or more detachable street lamps through the one or more data collection components includes: collecting the data using an infrared sensor disposed at each parking space and sending the collected data to the one or more detachable street lamps through the data collection component; the receiving the data sent by the hub, processing the received data, and sending the processed data to the terminal device through the cloud server includes: determining whether each parking space is occupied or not based on the received data through the cloud server; and obtaining the geographic location information corresponding to the unoccupied parking space and sending the geographic location information to the terminal device through the cloud server.

Those ordinary skill in the art can understand that, all or part of the processes in the methods of the above-mentioned embodiments can be performed by instructing relevant hardware through a computer program. The computer program may be stored in a non-volatile computer readable storage. When the computer program is executed, the process in the embodiment of each of the above-mention methods can be included. In which, any reference to the memory, storage, database or other media used in each embodiment provided in the present disclosure may include non-volatile and/or volatile memory. The non-volatile memory can include read-only memory (ROM), programmable ROM (PROM), electrically programmable ROM (EPROM), electrically erasable programmable ROM (EEPROM), or flash memory. The volatile memory can include random access memory (RAM) or external cache memory. As illustration rather than limitation, RAM can be in many forms, for example, static RAM (SRAM), dynamic RAM (DRAM), synchronous DRAM (SDRAM), double data rate SDRAM (DDRS-DRAM), enhanced SDRAM (ESDRAM), synchronous-link DRAM (SLDRAM), Rambus DRAM (RDRAM), direct Rambus DRAM (DRDRAM), and Rambus dynamic RAM (RDRAM), and the like.

The technical features of the above-mentioned embodiments can be arbitrarily combined. To simplify the description, all possible combinations of the technical features in the above-mentioned embodiments are not described. However, as long as there is no contradiction in the combination of these technical features, they should be considered to be within the scope of the present disclosure.

The above-mentioned embodiments only express several implementations of the present disclosure. Although their descriptions are specific and detailed, the descriptions should not be construed as limiting the scope of the present disclosure. It should be pointed out that, for those ordinary skilled in the art, without departing from the concept of the present disclosure, a number of modifications and improvements can be made, which all fall within the protection scope of the present disclosure. Therefore, the scope of the present disclosure shall be subject to the appended claims.

What is claimed is:

1. A system for realizing Internet of Things for smart city based on street lamps and lamp posts, comprising one or more data collection components, one or more detachable street lamps, a repeater, a hub, a cloud server, a terminal device; wherein the one or more data collection components are communicatively connected with the one or more detachable street lamps, the one or more detachable street lamp are communicatively connected with the repeater, the repeater is communicatively connected with the hub, the hub is communicatively connected with the cloud server, and the cloud server is communicatively connected with the terminal device, wherein:

the one or more data collection components are configured to obtain a current tag information set corresponding to a target monitoring object set using a radio frequency identification module of one or more data collection components and send the current tag information set to the one or more detachable street lamps;

the one or more detachable street lamps are configured to receive the current tag information set sent by the one or more data collection components and send the received current tag information set to the repeater via a built-in gateway;

the repeater is configured to receive the current tag information set sent by the one or more detachable street lamps and send the received current tag information set to the hub;

the hub is configured to receive the current tag information set sent by the repeater and send the received current tag information set to the cloud server;

the cloud server is configured to receive the current tag information set sent by the hub and compare a tag information amount of the received current tan information set corresponding to each of a plurality of different radio frequency identification modules of the data collection components to a tag information amount of a pre-stored tag information set with tag information classified and stored according to the different radio frequency identification modules after classifying tag information in the received current tag information set according to the different radio frequency identification modules;

the cloud server is further configured to obtain geographic location information and category information corresponding to a reduced tag information to send to a terminal device, in response to the tag information amount of the current tag information set being reduced with respect to the tag information amount of the pre-stored tag information set; and the terminal device is configured to receive the geographic location information and category information and display the received geographic location information and category information through a display screen.

2. The system of claim 1, wherein the data collection component comprises at least one of a security data collection module, a traffic navigation data collection module, and a radio frequency identification module.

3. The system of claim 2, wherein the data collected by the security data collection module comprises at least one of smoke monitoring data, gas monitoring data, dust monitoring data, mountain monitoring data, water level monitoring data, construction site monitoring data.

4. The system of claim 2, wherein the data collected by the traffic navigation data collection module comprises parking space data and traffic live data.

5. The system of claim 1, wherein the system further comprises:
 a lamp pole matched with each of the one or more detachable street lamps, wherein the lamp pole is disposed with at least one of a charging pile and an electronic advertising screen.

6. The system of claim 1, wherein each target monitoring object in the target monitoring object set is disposed with an RFID electronic tag for the radio frequency identification module to read; the radio frequency identification module sends a radio frequency signal to each target monitoring object in the target monitoring object set; the current tag information set is a set of tag information each corresponding to the electronic tag currently capable of performing radio frequency communication with the radio frequency identification module; and the one or more data collection components are further configured to:
 add the tag information corresponding to the target monitoring object to the current tag information set, in response to receiving the radio frequency signal returned by the target monitoring object.

7. The system of claim 1, wherein the geographic location information is geographic location information of the target monitoring object where an electronic tag is disposed; and the cloud server is configured to obtain the geographic location information and category information corresponding to the reduced tag information by:
 searching the corresponding target monitoring object based on the reduced tag information through a preset association relationship between the tag information corresponding to the electronic tag and the target monitoring object; and
 obtaining the geographic location information and category information corresponding to the corresponding target monitoring object.

8. A computer-implemented method for realizing Internet of Things for smart city based on street lamps and lamp posts, comprising executing on a processor steps of:
 obtaining a current tag information set corresponding to a target monitoring object set using a radio frequency identification module of one or more data collection components and sending the current tag information set to one or more detachable street lamps through the one or more data collection components;
 receiving the current tag information set sent by the one or more data collection components and sending the received current tag information set to a repeater via a built-in gateway through the one or more detachable street lamps;
 receiving the current tag information set sent by the one or more detachable street lamps and sending the received current tag information set to a hub through the repeater;
 receiving the current tag information set sent by the repeater and sending the received current tag information set to a cloud server through the hub;
 receiving the current tag information set sent by the hub and comparing a tag information amount of the received current tag information set corresponding to each of a plurality of different radio frequency identification modules of the data collection components to a tag information amount of a pre-stored tag information set with tag information classified and stored according to the different radio frequency identification modules after classifying tag information in the received current tag information set according to the different radio frequency identification modules through the cloud server;
 obtaining geographic location information and category information corresponding to a reduced tag information to send to a terminal device through the cloud server, in response to the tag information amount of the current tag information set being reduced with respect to the tag information amount of the pre-stored tag information set; and
 receiving the geographic location information and category information and displaying the received geographic location information and category information using a display screen through the terminal device.

9. The method of claim 8, wherein the data collection component comprises at least one of a security data collection module, a traffic navigation data collection module, and a radio frequency identification module.

10. The method of claim 8, wherein each target monitoring object in the target monitoring object set is disposed with an RFID electronic tag for the radio frequency identification module to read; the radio frequency identification module sends a radio frequency signal to each target monitoring object in the target monitoring object set; the current tag information set is a set of tag information each corresponding to the electronic tag currently capable of performing radio frequency communication with the radio frequency identification module; and the method further comprises:
 adding the tag information corresponding to the target monitoring object to the current tag information set through the one or more data collection components, in response to receiving the radio frequency signal returned by the target monitoring object.

11. The method of claim 8, wherein the geographic location information is geographic location information of the target monitoring object where an electronic tag is disposed; and the step of obtaining the geographic location information and category information corresponding to the reduced tag information comprise:
 searching the corresponding target monitoring object based on the reduced tag information through a preset association relationship between the tag information corresponding to the electronic tag and the target monitoring object; and
 obtaining the geographic location information and category information corresponding to the corresponding target monitoring object.

12. A non-transitory computer-readable storage medium storing one or more computer programs executable on a processor, wherein the one or more computer programs comprise:
 instructions for obtaining a current tag information set corresponding to a target monitoring object set using a radio frequency identification module of one or more data collection components and sending the current tag information set to one or more detachable street lamps through the one or more data collection components;
 instructions for receiving the current tag information set sent by the one or more data collection components and sending the received current tag information set to a repeater via a built-in gateway through the one or more detachable street lamps;

instructions for receiving the current tag information set sent by the one or more detachable street lamps and sending the received current tag information set to a hub through the repeater;

instructions for receiving the current tag information set sent by the repeater and sending the received current tag information set to a cloud server through the hub;

instructions for receiving the current tag information set sent by the hub and comparing a tag information amount of the received current tag information set corresponding to each of a plurality of different radio frequency identification modules of the data collection components to a tag information amount of a pre-stored tag information set with tag information classified and stored according to the different radio frequency identification modules after classifying tag information in the received current tag information set according to the different radio frequency identification modules through the cloud server;

instructions for obtaining geographic location information and category information corresponding to a reduced tag information to send to a terminal device through the cloud server, in response to the tag information amount of the current tag information set being reduced with respect to the tag information amount of the pre-stored tag information set; and instructions for receiving the geographic location information and category information and displaying the received geographic location information and category information using a display screen through the terminal device.

13. The storage medium of claim 12, wherein each target monitoring object in the target monitoring object set is disposed with an RFID electronic tag for the radio frequency identification module to read; the radio frequency identification module sends a radio frequency signal to each target monitoring object in the target monitoring object set; the current tag information set is a set of tag information each corresponding to the electronic tag currently capable of performing radio frequency communication with the radio frequency identification module; and the one or more computer programs further comprise:

instructions for adding the tag information corresponding to the target monitoring object to the current tag information set through the one or more data collection components, in response to receiving the radio frequency signal returned by the target monitoring object.

14. The storage medium of claim 12, wherein the geographic location information is geographic location information of the target monitoring object where an electronic tag is disposed; and the instructions for obtaining the geographic location information and category information corresponding to the reduced tag information comprise:

instructions for searching the corresponding target monitoring object based on the reduced tag information through a preset association relationship between the tag information corresponding to the electronic tag and the target monitoring object; and instructions for obtaining the geographic location information and category information corresponding to the corresponding target monitoring object.

\* \* \* \* \*